United States Patent
Hamano (10) Patent No.: US 11,875,497 B2
(45) Date of Patent: Jan. 16, 2024

(54) ULTRASONIC FLAW DETECTION DEVICE (71) Applicant: IHI CORPORATION, Tokyo (JP)

(72) Inventor: Toshiaki Hamano, Tokyo (JP)

(73) Assignee: IHI CORPORATION, Tokyo (JP)

( * ) Notice: Subject to any disclaimer, the term of this patent is extended or adjusted under 35 U.S.C. 154(b) by 352 days.

(21) Appl. No.: 17/412,619

(22) Filed: Aug. 26, 2021

(65) Prior Publication Data

US 2021/0390680 A1 Dec. 16, 2021

Related U.S. Application Data (63) Continuation of application No. PCT/JP2020/008431, filed on Feb. 28, 2020.

(30) Foreign Application Priority Data

Feb. 28, 2019 (JP) .................... 2019-035946

(51) Int. Cl.
G06T 7/00 (2017.01)
(52) U.S. Cl.
CPC .. *G06T 7/0002* (2013.01); *G06T 2207/10132* (2013.01)
(58) Field of Classification Search
CPC ............... G06T 7/0002; G06T 2207/10132
See application file for complete search history.

(56) References Cited

U.S. PATENT DOCUMENTS

| 2008/0307886 | A1 | 12/2008 | Marsh et al. |
| 2014/0015960 | A1* | 1/2014 | Niedermeier ........... G06T 7/001 348/128 |
| 2016/0231284 | A1* | 8/2016 | Shiina ................. G01N 29/043 |
| 2017/0219422 | A1 | 8/2017 | Hamano et al. |
| 2018/0165626 | A1 | 6/2018 | Davidson et al. |

FOREIGN PATENT DOCUMENTS

| JP | 2001-349878 A | 12/2001 |
| JP | 2013-033028 A | 2/2013 |
| JP | 2017-163093 A | 9/2017 |
| TW | 201518724 A | 5/2015 |
| TW | 201623957 A | 7/2016 |
| WO | 2016/098224 A1 | 6/2016 |

* cited by examiner

*Primary Examiner* — David F Dunphy (57) ABSTRACT

An ultrasonic flaw detection device (A) includes: an ultrasonic probe (2) that emits ultrasonic waves to an inspection object (P) and detects reflected waves; a sheet material (1) attached to a surface of the inspection object and having two-dimensional patterns, the two-dimensional patterns being arranged on the inspection object and indicating positions on the inspection object; an imaging device (3) attached to the ultrasonic probe and imaging the two-dimensional patterns (1a); and a processing unit (21) that reads position information indicating a position on the inspection object from a captured image captured by the imaging device and relates a detection result of the ultrasonic probe to the position information, wherein the processing unit determines an index indicating the degree of quality of the detection result based on an air pocket area (HA) that is an area in which air pockets are shown in a predetermined area (H) of the captured image.

5 Claims, 4 Drawing Sheets

ULTRASONIC FLAW DETECTION DEVICE

CROSS REFERENCE TO RELATED APPLICATIONS

This patent application is a continuation application of co-pending International Patent Application No. PCT/JP2020/008431 designating the United States of America and filed on Feb. 28, 2020, which in turn claims the benefit of foreign priority to Japanese Patent Application No. JP 2019-035946 filed on Feb. 28, 2019, the contents of all of which applications are hereby incorporated by reference. The International Application was published in Japanese on Sep. 3, 2020, as International Publication No. WO 2020/175687 A1 under PCT Article 21(2).

TECHNICAL FIELD

The present disclosure relates to an ultrasonic flaw detection device.

Priority is claimed on Japanese Patent Application No. 2019-035946, filed Feb. 28, 2019, the content of which is incorporated herein by reference.

BACKGROUND

Patent Document 1 below discloses an ultrasonic flaw detection device that scans an inspection object using an ultrasonic probe to detect flaws in the inspection object.

When there are air pockets between the ultrasonic probe and the inspection object, since the air pockets hinder the transmission of ultrasonic waves, the ultrasonic flaw detection device may not correctly detect flaws in the inspection object, and the reliability of the ultrasonic flaw detection inspection may decrease.

Therefore, it is conceivable that an examiner visually checks whether or not there are air pockets, and when the air pockets are present, the detection results of the ultrasonic probe are not used for the ultrasonic flaw detection inspection.

DOCUMENT OF RELATED ART

Patent Document

[Patent Document 1] PCT International Publication No. WO 2016/098224

SUMMARY

Technical Problem

However, depending on a surface condition such as undulations of the inspection object, it is practically difficult to completely eliminate air pockets, and the air pockets may have to be allowed to some extent.

The present disclosure is made in view of such circumstances, and an object thereof is to provide an ultrasonic flaw detection device that can limit a decrease in the reliability of an ultrasonic flaw detection inspection even when there are air pockets between an ultrasonic probe and an inspection object.

Solution to Problem (1) An aspect of the present disclosure is an ultrasonic flaw detection device, including: an ultrasonic probe that emits ultrasonic waves to an inspection object and detects reflected waves; a sheet material attached to a surface of the inspection object and having two-dimensional patterns shown thereon, the two-dimensional patterns being arranged on the inspection object and indicating positions on the inspection object; an imaging device attached to the ultrasonic probe and imaging the two-dimensional patterns; and a processing unit that reads position information indicating a position on the inspection object from a captured image captured by the imaging device and relates a detection result of the ultrasonic probe to the position information, wherein the processing unit determines an index indicating the degree of quality of the detection result based on an air pocket area that is an area in which air pockets are shown in a predetermined area of the captured image.

(2) In the ultrasonic flaw detection device of the above (1), the processing unit may determine the ratio of the number of pixels of the air pocket area to the number of total pixels of the predetermined area in the captured image and may determine the contact rate of the sheet material to the inspection object.

(3) In the ultrasonic flaw detection device of the above (2), the processing unit may determine the contact rate from the captured image obtained at the same time as the detection result of the ultrasonic probe and may relate the determined contact rate to the detection result.

(4) The ultrasonic flaw detection device of the above (3) may include: a display control unit that displays, on a display, a scanning area of the ultrasonic probe on the inspection object such that the scanning area is divided into a plurality of divided areas arranged in mesh pattern, wherein the display control unit may display, in a first display mode, a divided area of the plurality of divided areas containing position information related to the contact rate when the contact rate is greater than a threshold value and may display, in a second display mode different from the first display mode, a divided area of the plurality of divided areas containing position information related to the contact rate when the contact rate is equal to or less than the threshold value.

(5) The ultrasonic flaw detection device of the above (4) may include an operation unit, wherein when any divided area is selected from the plurality of divided areas through the operation unit, the display control unit may display, on the display, the detection result corresponding to the selected divided area and the contact rate related to the corresponding detection result.

Effects

As described above, according to the present disclosure, even when there are air pockets between the ultrasonic probe and the inspection object, it is possible to limit a decrease in the reliability of the ultrasonic flaw detection inspection.

DESCRIPTION OF EMBODIMENTS

Hereinafter, an ultrasonic flaw detection device of an embodiment is described with reference to the drawings.

An ultrasonic flaw detection device A of this embodiment is used for an ultrasonic flaw detection inspection of an object (inspection object) and detects flaws in the inspection object. In this embodiment, the ultrasonic flaw detection device A regards a pipe P as the inspection object and detects flaws such as cracks occurring at weld lines of the pipe P.

Figure 1:
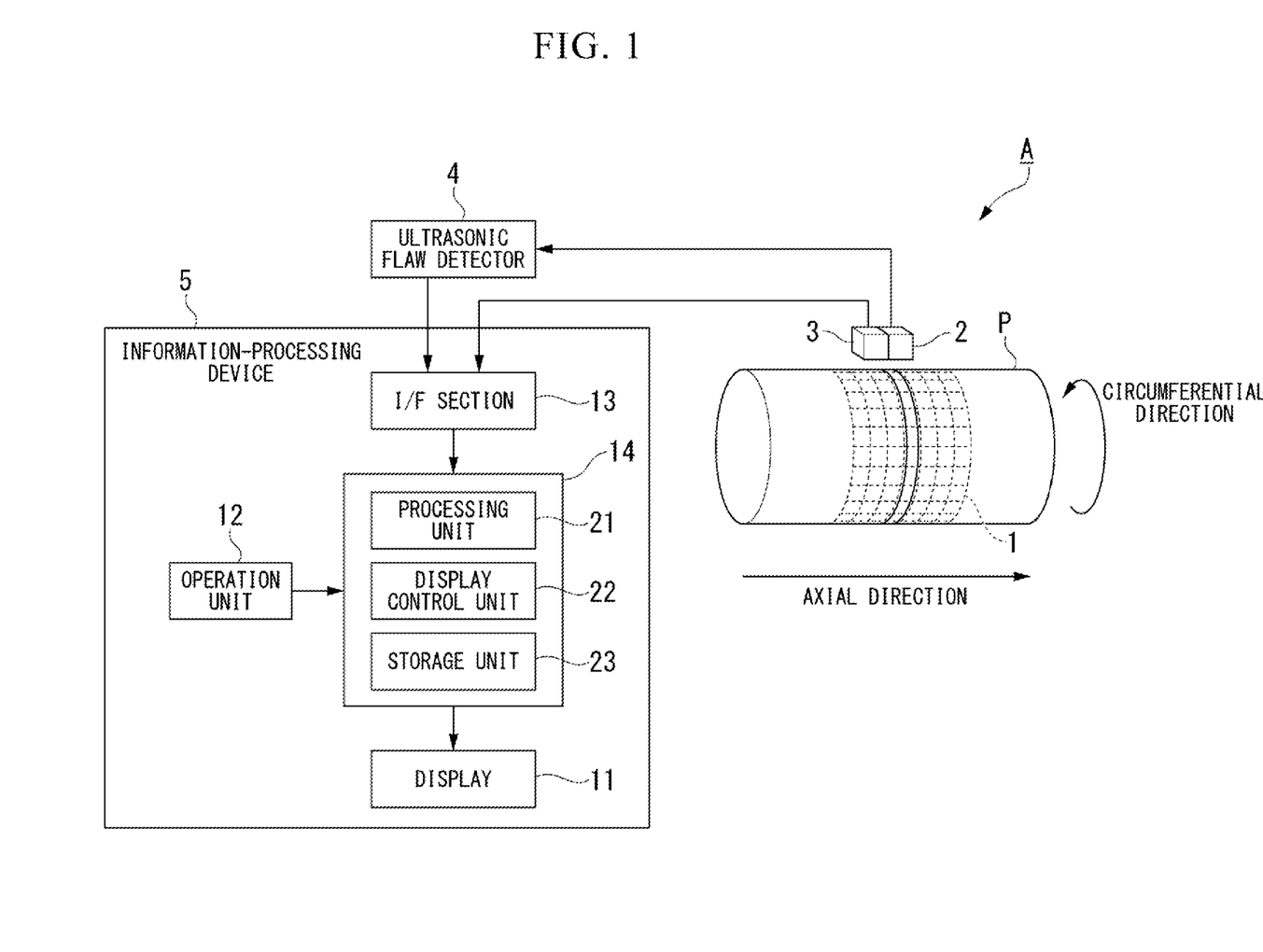
FIG. 1 is a diagram showing an example of a schematic configuration of an ultrasonic flaw detection device of an embodiment.

FIG. 1 is a diagram showing an example of the schematic configuration of the ultrasonic flaw detection device of this embodiment. As shown in FIG. 1, the ultrasonic flaw detection device A includes a sheet material 1, an ultrasonic probe 2, an imaging device 3, an ultrasonic flaw detector 4 and an information-processing device 5.

Figure 2:
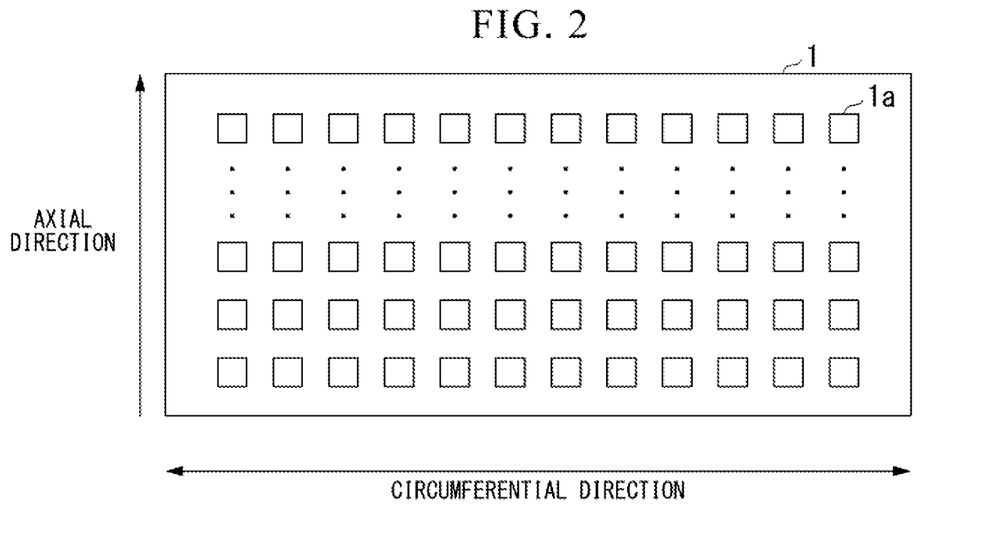
FIG. 2 is a diagram showing an example of a sheet material of the embodiment.

The sheet material 1 is attached to a surface of the pipe P. As shown in FIG. 2, the sheet material 1 has a plurality of two-dimensional patterns 1a shown on its surface. The plurality of two-dimensional patterns 1a are arranged on the pipe P and indicate positions on the pipe P. For example, two-dimensional patterns 1a are shown in the sheet material 1 to be arranged in the axial direction (central axis direction) and the circumferential direction of the pipe P. In the two-dimensional pattern 1a, information (hereinafter referred to as "position information") indicating a position (coordinates) on the pipe P is encrypted. For example, the two-dimensional patterns 1a are arranged at intervals of 10 mm in the axial direction and the circumferential direction of the pipe P. For example, the two-dimensional pattern 1a is a QR® code. The sheet material 1 is provided in an area of the outer surface of the pipe P that is scanned by the ultrasonic probe.

The sheet material 1 may not be only directly attached to the surface of the pipe P but may be attached to the surface of the pipe P in a state where a contact medium for transmitting ultrasonic waves is applied to the surface of the pipe P. When the sheet material 1 is attached to the pipe P through the contact medium applied onto the pipe P in this way, the sheet material 1 can be adhered to the pipe P with the adhesiveness of the contact medium. The contact medium allows the sheet material 1 to be attached flat (i.e., along a peripheral surface extending in the axial direction and the circumferential direction) even if the surface of the pipe P is uneven. The contact medium may be a substance that transmits ultrasonic waves while limiting the attenuation thereof and is, for example, glycerin, water, oil or the like.

The ultrasonic probe 2 is connected to the ultrasonic flaw detector 4 through a coaxial cable and can be moved on the pipe P (on the outer surface of the pipe P). The ultrasonic probe 2 emits ultrasonic waves from a portion thereof and detects the reflected waves of the ultrasonic waves. The ultrasonic probe 2 outputs the waveforms of the detected reflected waves (echoes) as detection signals (detection results) W to the ultrasonic flaw detector 4. For example, the ultrasonic probe 2 scans a predetermined area (hereinafter referred to as "scanning area") S (refer to FIG. 4) on the pipe P by ultrasonic waves while being moved on the surface of the pipe P manually by an examiner and detects echoes indicating cracks or the like in the pipe P.

The imaging device 3 is attached to the ultrasonic probe 2. In other words, the imaging device 3 is connected to the ultrasonic probe 2 and is moved in conjunction with the movement of the ultrasonic probe 2. The imaging device 3 is, for example, an optical imaging device that captures images of the two-dimensional patterns 1a of the sheet material 1 attached onto the pipe P. The imaging device 3 is connected to the information-processing device 5 through a signal cable. The imaging device 3 outputs captured images G of the imaged two-dimensional patterns 1a to the information-processing device 5. For example, the imaging device 3 includes a light-emitting unit provided with a light-emitting element such as an LED (Light Emitting Diode) and an imaging unit such as a CCD (Charge Coupled Device) camera and is attached to the trailing side in the moving direction of the ultrasonic probe 2. The imaging device 3 may be attached to any part of the ultrasonic probe 2 as long as the two-dimensional patterns 1a of the sheet material 1 can be imaged. The imaging device 3 may be integrated with the ultrasonic probe 2 in a same housing or may have a separated structure therefrom.

For example, the ultrasonic probe 2 and the imaging device 3 may be integrated as an inspection probe. For the configuration of the inspection probe of this embodiment, for example, the configuration of an inspection probe shown in PCT International Publication No. WO 2016/098224 can be used.

The ultrasonic flaw detector 4 is connected to the ultrasonic probe 2 and the information-processing device 5. The ultrasonic flaw detector 4 supplies electric power to the ultrasonic probe 2. The ultrasonic flaw detector 4 A/D-converts the detection signals W input from the ultrasonic probe 2 and outputs it to the information-processing device 5. In other words, the ultrasonic flaw detector 4 includes an A/D converter. The directions of arrows in FIG. 1 indicate directions in which the detection signals W flow and have nothing to do with the direction of the above-described electric power supply.

The ultrasonic probe 2 may be supplied with electric power from the ultrasonic flaw detector 4, and the imaging device 3 may be supplied with electric power from the information-processing device 5. The connection of the ultrasonic probe 2 and the imaging device 3 to the ultrasonic flaw detector 4 and the information-processing device 5 is not limited only to wired connection but may also be wireless connection.

The information-processing device 5 is connected to the ultrasonic flaw detector 4. For example, the information-processing device 5 is a desktop or laptop computer.

The information-processing device 5 of this embodiment is described below. As shown in FIG. 1, the information-processing device 5 includes a display 11, an operation unit 12, a communication I/F section 13 and a control unit 14.

The display 11 displays the information from the control unit 14 on its display screen. For example, the display 11 is a CRT (Cathode Ray Tube) display or a liquid crystal display and displays various information under the control of the control unit 14.

The operation unit 12 accepts a user's operations and outputs, to the control unit 14, operation instructions corresponding to the operations received from the user. For example, the operation unit 12 is a pointing device such as a mouse, a keyboard, or another operating device.

The communication I/F section 13 sends and receives various signals to and from the ultrasonic flaw detector 4 through a communication cable under the control of the control unit 14. The communication I/F section 13 transmits, to the control unit 14, the detection signals W received from the ultrasonic flaw detector 4 through the communication cable.

The communication I/F section 13 is connected to the imaging device 3 through a signal cable and receives captured images G of the two-dimensional patterns 1a captured by the imaging device 3. The communication I/F section 13 A/D-converts the image information of the received captured images G and transmits it to the control unit 14.

For example, the control unit 14 includes a CPU (Central Processing Unit), a ROM (Read Only Memory), a RAM (Random Access Memory) and the like.

The functional units of the control unit 14 of this embodiment are described below. The control unit 14 of this embodiment includes a processing unit 21, a display control unit 22 and a storage unit 23. The processing unit 21 and the display control unit 22 may each include a CPU, a ROM, a RAM and the like. The storage unit 23 may include a storage device such as a ROM and a RAM.

The processing unit 21 executes a reading process that reads position information indicating a position on the inspection object from the captured image G. That is, the processing unit 21 executes the reading process that reads the position information encrypted in the two-dimensional pattern 1a shown in the captured image G by analyzing this captured image G. The processing unit 21 relates the position information read by the reading process to the detection signal W received from the ultrasonic flaw detector 4 at the time the captured image G used for this reading process is obtained. In other words, the processing unit 21 relates the detection signal W received from the ultrasonic flaw detector 4 to the position information read from the captured image G obtained at the same time as this detection signal W.

The processing unit 21 executes an air pocket detection process that detects an area (hereinafter referred to as "air pocket area") HA of air pockets shown in a predetermined area H of the captured image G based on the image information of the captured image G. For example, the processing unit 21 performs a predetermined image process on the captured image G using the image information of the captured image G obtained from the communication I/F section 13 to execute the air pocket detection process that detects the air pocket area HA. The predetermined image process is a process for detecting the air pocket area HA, and a known image process such as a binarization process may be used therefor. The detecting the air pocket area HA denotes, for example, obtaining the number Na of pixels of the air pocket area HA.

The same captured images G are to be used for the reading process and for the air pocket detection process.

The processing unit 21 executes a calculation process in which the ratio of the air pocket area HA to the predetermined area H is determined and a contact rate R is determined from the ratio. This contact rate R indicates the ratio of a contact area between the surface of the pipe P and the sheet material 1 to the predetermined area H. For example, the processing unit 21 obtains the ratio of the number Na of pixels to the number Ns of total pixels of the predetermined area H in the captured image G through the calculation process. The processing unit 21 determines the contact rate R using the following formula (1).

$$\text{The contact rate } R\ [\%] = (1 - Na/Ns) \times 100 \quad (1)$$

Figure 3A:
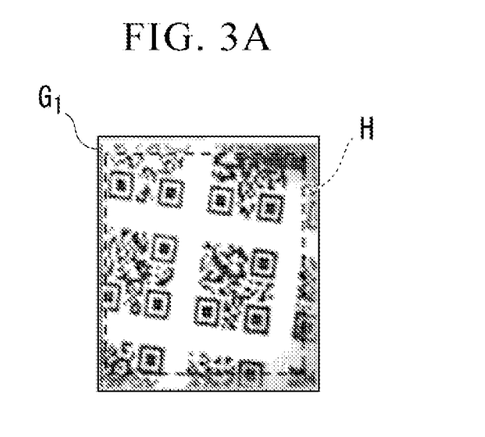
FIG. 3A is a diagram used for describing a calculation process of a processing unit of the embodiment, the diagram showing a captured image containing no air pockets.
Figure 3B:
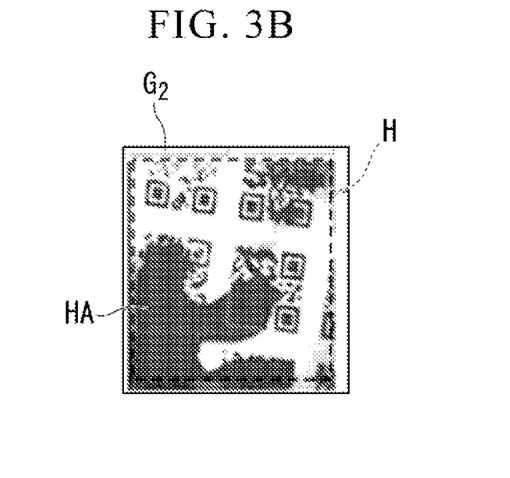
FIG. 3B is a diagram used for describing the calculation process of the processing unit of the embodiment, the diagram showing a captured image containing air pockets.

FIGS. 3A and 3B are diagrams used for describing the calculation process of the processing unit 21 of this embodiment. FIG. 3A shows a captured image G1 with no air pockets, and FIG. 3B shows a captured image G2 with air pockets.

As shown in FIG. 3A, there are no air pockets in the predetermined area H of the captured image G1. Therefore, the processing unit 21 performs the air pocket detection process and the calculation process on the captured image G1 to obtain a contact rate R1 of the predetermined area H in the captured image G1=100%. On the other hand, as shown in FIG. 3B, there are air pockets in the predetermined area H of the captured image G2. Therefore, the processing unit 21 performs the air pocket detection process on the captured image G2 to obtain the number Na of pixels of the air pocket area HA. The processing unit 21 performs the calculation process using the formula (1) to obtain a contact rate R2 of the predetermined area H in the captured image G2. When the ratio of the number Na of pixels to the number Ns of total pixels is 30%, the processing unit 21 performs the calculation process using the formula (1) to obtain the contact rate R2 of the predetermined area H in the captured image G2=70%.

Next, the processing unit 21 relates the contact rate R determined through the calculation process to the detection signal W received from the ultrasonic flaw detector 4 at the time the captured image G used for this calculation process was obtained. In other words, the processing unit 21 relates the detection signal W received from the ultrasonic flaw detector 4 to the contact rate R determined from the captured image G obtained at the same time as this detection signal W.

Figure 4:
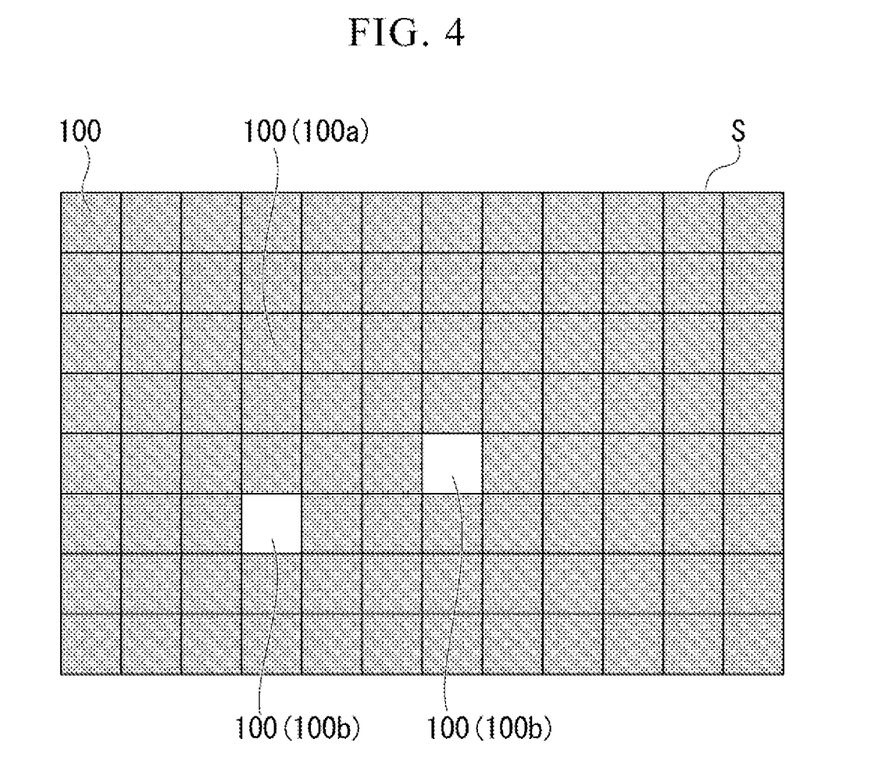
FIG. 4 shows an example of a display screen of a display of the embodiment.

The display control unit 22 displays, on a display screen of the display 11, the scanning area S of the ultrasonic probe 2 on the pipe P such that the scanning area S is divided into a plurality of divided areas 100 arranged in mesh pattern. FIG. 4 shows an example of the display screen of the display 11 of this embodiment.

The display control unit 22 compares the contact rate R calculated by the processing unit 21 with a threshold Rth set in advance and when the contact rate R is greater than the threshold Rth, the display control unit 22 displays, in a first display mode, a divided area 100a of the plurality of divided areas 100 containing the position information related to this contact rate R. On the other hand, the display control unit 22 compares the contact rate R calculated by the processing unit 21 with the threshold Rth set in advance and when the contact rate R is equal to or less than the threshold Rth, the display control unit 22 displays, in a second display mode different from the first display mode, a divided area 100b of the plurality of divided areas 100 containing the position information related to this contact rate R. For example, the first display mode may be to fill the divided area 100a with a first color, and the second display mode may be to fill the divided area 100b with a second color different from the first color. The first display mode may be to fill the divided area 100a with the first color, and the second display mode may be not to fill the divided area 100b. The first display mode may be to show a first mark in the divided area 100a, and the second display mode may be to show a second mark different from the first mark in the divided area 100b.

The threshold Rth may be set according to a surface condition such as undulations in the surface of the inspection object.

For example, the display control unit 22 does not fill a divided area of the plurality of divided areas 100 containing no position information. That is, the display control unit 22 does not fill a divided area 100 of the plurality of divided areas 100 in which the scanning of the ultrasonic flaw detection has not been performed. For example, when the contact rate R is equal to or less than the threshold Rth, the display control unit 22 does not fill the divided area 100b of the plurality of divided areas 100 containing the position information related to this contact rate R. Therefore, the user refers to the display screen of the display 11, rescans the unfilled divided areas 100, and thereby can perform the ultrasonic flaw detection inspection on the inspection object with high accuracy and without omission of inspection.

The storage unit 23 stores the detection signal W (echo waveform), the position information and the contact rate R in a state where they are related to each other. The storage unit 23 may store an inspection program. The control unit 14 may operate based on the inspection program stored in the storage unit 23 (e.g., ROM) to execute the reading process, the air pocket detection process, and the calculation process. The storage unit 23 may store a display program. The control unit 14 may operate based on the display program stored in the storage unit 23 (e.g., ROM), thereby when the contact rate R is greater than the threshold Rth, the control unit 14 may display, in the first display mode, the divided area 100a of the plurality of divided areas 100 containing the position information related to this contact rate R, and in contrast when the contact rate R is equal to or less than the threshold Rth, the control unit 14 may display, in the second display mode different from the first display mode, the divided area 100b of the plurality of divided areas 100 containing the position information related to this contact rate R.

Figure 5:
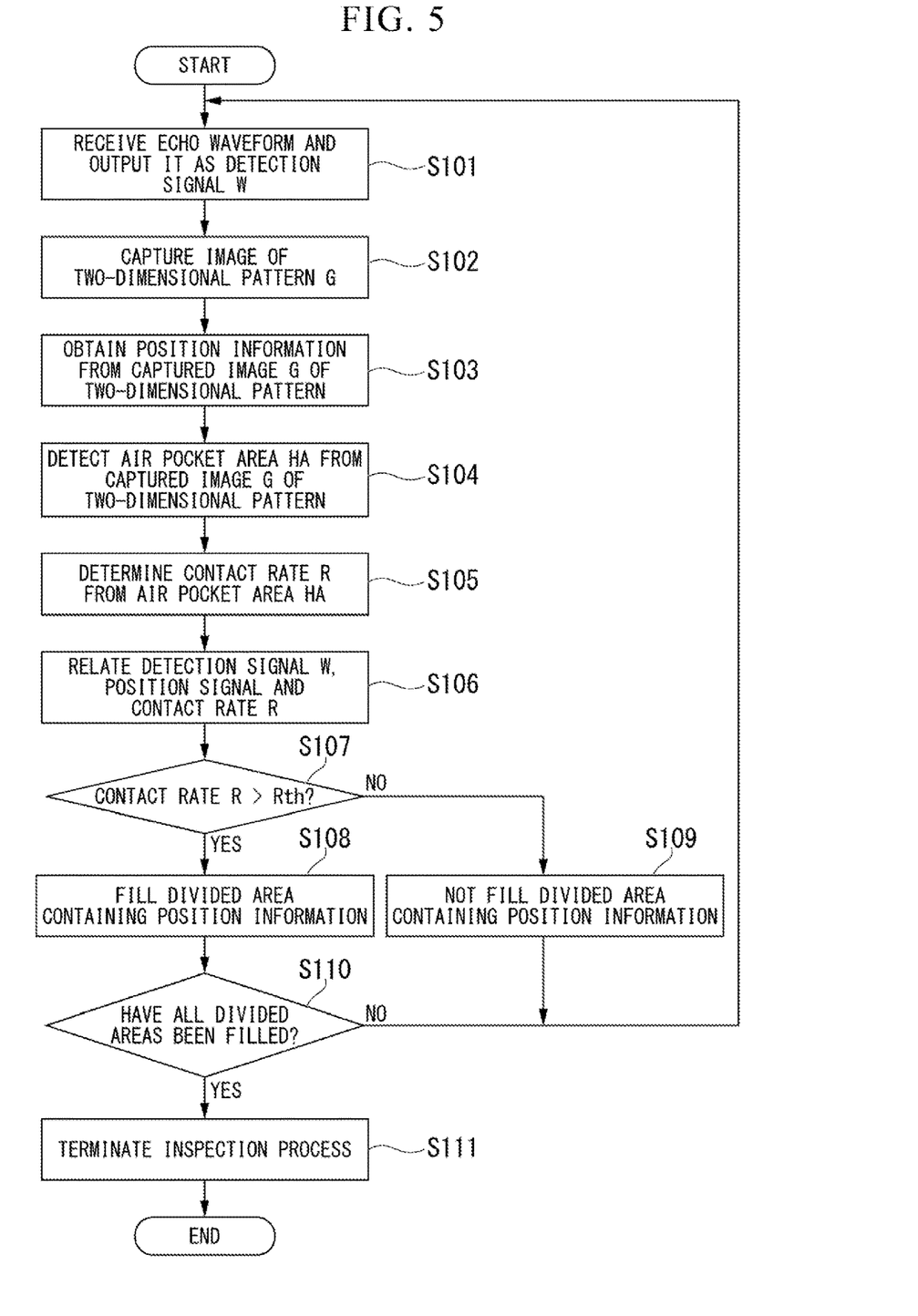
FIG. 5 is a flow chart of the ultrasonic flaw detection device of the embodiment.

Next, the operation of the inspection process (the reading process, the air pocket detection process and the calculation process) of the ultrasonic flaw detection device A of this embodiment is described with reference to FIG. 5. FIG. 5 is a flow chart of the ultrasonic flaw detection device A of this embodiment.

The examiner scans an inspection portion on the pipe P using the ultrasonic probe 2 in order to detect defects, such as cracks, and corrosion that occur in the pipe P. For example, the examiner moves the ultrasonic probe 2 in the scanning area S in the axial direction to scan from a first end to a second end of the scanning area S in the axial direction. Next, when the ultrasonic probe 2 reaches the second end, the examiner shifts the ultrasonic probe 2 to a position in the circumferential direction and makes the ultrasonic probe 2 scan from the position toward the first end in the axial direction. Then, the examiner repeats the above scanning using the ultrasonic probe 2 to scan the entire inspection portion on the pipe P, that is, the entire scanning area S.

At this time, the ultrasonic probe 2 detects the reflected waves of the emitted ultrasonic waves and outputs the waveforms of the reflected waves (echoes) as the detection signals (detection results) W through the ultrasonic flaw detector 4 to the information-processing device 5 (step S101). The imaging device 3 outputs the captured images G of the two-dimensional patterns 1a to the information-processing device 5 (step S102).

When the information-processing device 5 receives a detection signal Wt and a captured image Gt at the same time or in a period of time that can be regarded as the same time, the information-processing device 5 executes the reading process, the air pocket detection process and the calculation process based on the captured image Gt.

Specifically, the processing unit 21 executes the reading process to obtain the position information (e.g., absolute coordinates) on the pipe P based on the two-dimensional pattern 1a (e.g., QR Code®) contained in the captured image Gt (step S103). Then, the processing unit 21 causes the detection signal Wt from the ultrasonic probe 2 and the position information to be stored in the storage unit 23 in a state where they are related to each other (step S104). That is, the processing unit 21 relates the detection signal Wt from the ultrasonic probe 2 to the position information obtained from the captured image Gt and causes them to be stored in the storage unit 23.

The processing unit 21 executes the air pocket detection process to detect the air pocket area HA shown in the predetermined area H of the captured image Gt based on the image information of the captured image Gt used in the reading process (step S104).

Then, the processing unit 21 executes the calculation process to determine the ratio of the air pocket area HA to the predetermined area H of the captured image Gt and to determine a contact rate Rt from the ratio. For example, the processing unit 21 determines the ratio of the number Na of pixels of the air pocket area HA to the number Ns of total pixels in the captured image Gt and determines the contact rate Rt using the above formula (1) (step S105). Then, the processing unit 21 causes the contact rate Rt and the detection signal Wt to be stored in the storage unit 23 such that they are related to each other. Therefore, the storage unit 23 stores a data set in which the contact rate Rt, the detection signal Wt, and the position information obtained from the captured image Gt are related to each other (step S106).

The display control unit 22 determines whether or not the contact rate Rt calculated by the processing unit 21 is greater than the threshold Rth set in advance (step S107). When the contact rate Rt is greater than the threshold Rth, the display control unit 22 displays, in the first display mode, the divided area 100a of the plurality of divided areas 100 containing the position information related to this contact rate Rt (step S108). On the other hand, when the contact rate Rt is equal to or less than the threshold Rth, the display control unit 22 displays, in the second display mode different from the first display mode, the divided area 100b of the plurality of divided areas 100 containing the position information related to this contact rate Rt (step S109). For example, the display control unit 22 fills the divided area 100a as in the first display mode and does not fill the divided area 100b as in the second display mode. The processing unit 21 may delete the above data set of the divided area 100b from the storage unit 23.

The processing unit 21 determines whether or not all of the divided areas 100 have been filled (step S110). The processing unit 21 terminates the inspection process when all of the divided areas 100 have been filled (step S111). That is, when the above data set has been obtained with respect to each of the divided areas 100, the processing unit 21 terminates the inspection process. On the other hand, the processing unit 21 does not terminate the inspection process when at least one divided area 100 has not been filled. That is, when there is no data set corresponding to at least one divided area 100 or when there is a divided area 100 having only the detection signal W obtained at the time the contact rate R is Rth or less, the inspection process is not terminated.

Thereby, it is necessary for the examiner to rescan portions in which the contact rate R is low, and thus the reliability of the inspection can be prevented from decreasing due to the deterioration of the contact rate.

When two or more data sets are obtained with respect to the same divided area 100, the processing unit 21 may cause only the latest data set to be stored in the storage unit 23. When two or more data sets are obtained with respect to the same divided area 100, the processing unit 21 may cause only the data set having the highest contact rate R to be stored in the storage unit 23. If the above data set corresponding to a divided area 100 is stored in the storage unit 23 when the contact rate R is the threshold Rth, the processing unit 21 may not have to subsequently obtain a data set with respect to this divided area 100. That is, the processing unit 21 may not have to execute the inspection process on a divided area 100 having a data set in which the contact rate R is the threshold Rth even if the detection signal W and the captured image G are obtained.

The processing unit 21 may create flaw detection distribution data based on the above data sets. The display control unit 22 may display the flaw detection distribution data. The display control unit 22 may display the contact rates R in correspondence with the flaw detection distribution data. When the flaw detection distribution data is displayed on the display 11, one of colors (e.g., red, blue, yellow and the like) indicating flaw detection results is shown in each of positions on the pipe P or in each of the divided areas 100 as a mapped image.

The processing unit 21 may relate the detection signal W by the ultrasonic probe 2, the position information on the pipe P, and time to each other and may cause them to be stored in the storage unit 23. Thereby, the processing unit 21 can obtain the moving route of the ultrasonic probe 2. In this case, the display control unit 22 may display the moving route on the display 11. As a display format of the mapped image, the processing unit 21 may perform a volume-rendering process that considers not only the position of the ultrasonic probe 2 but also the inclination of the ultrasonic probe 2 and the shape of an inspection target (e.g., the pipe P).

The processing unit 21 may record free operation of the ultrasonic probe 2 such as turning of the ultrasonic probe 2 around a defect or a thinned portion of the inspection target.

Hereinbefore, the embodiment of the present disclosure has been described in detail with reference to the drawings, but the specific configuration is not limited to this embodiment, and design changes within the scope of the present disclosure are also included.

(First Modification) The ultrasonic flaw detection device A of the above embodiment includes one imaging device 3, but the number of imaging devices 3 is not limited, and a plurality of imaging devices 3 may be provided. For example, the ultrasonic flaw detection device A may include a total of two imaging devices 3 on the front and rear sides of the ultrasonic probe 2 such that the ultrasonic probe 2 is disposed therebetween.

(Second Modification) The imaging device 3 of the above embodiment does not include a light-emitting unit provided with a light-emitting element such as an LED but may include a laser oscillator. When the imaging device 3 uses the laser oscillator, a contrast can be increased between a portion where the two-dimensional pattern 1a is shown and another portion where the two-dimensional pattern 1a is not shown in the sheet material 1 to which a laser beam is emitted.

(Third Modification) The ultrasonic flaw detection device A of the above embodiment may include a plurality of ultrasonic probes 2. The ultrasonic probe 2 may be a phased array.

(Fourth Modification) When any divided area is selected from the plurality of divided areas 100 through the operation unit 12, the display control unit 22 of the above embodiment may display the data set corresponding to the selected divided area on the display 11. For example, when any divided area is selected from the plurality of divided areas 100 through the operation unit 12, the display control unit 22 may display, on the display 11, the detection signal W corresponding to the selected divided area and the contact rate R related to the corresponding detection signal W. The detection signal W corresponding to the selected divided area is a detection signal related to the position information contained in the selected divided area.

When there are air pockets between the ultrasonic probe 2 and the inspection object, a noise may be mixed in an echo due to the influence of the reflection from the air pockets. Therefore, the examiner may not be able to immediately determine whether the echo is an echo from a defect or a noise caused by a contact condition. In the fourth modification, the control unit 14 determines the contact rate R and displays this contact rate R together with the detection signal on the display 11. Thereby, the examiner can determine whether the echo is a noise due to the influence of contact or is an echo from the inside of an inspection body.

(Fifth Modification) The display control unit 22 of the above embodiment may display the captured image G on the display 11. At that time, the display control unit 22 may display the contact rate R together with the captured image G. As the display mode for the contact rate R, the value of the contact rate R may be shown, or a display bar indicating the value of the contact rate R may be shown.

The examiner often separates the inspection probe from the inspection object in order to add a couplant or to rescan. At the time the inspection probe is separated from the inspection object, a water gap is formed, and a noise occurs in the detection signal W. The processing unit 21 of this embodiment can remove the detection signal W mixed with the above noise by excluding data sets in which the contact rate R is equal to or less than the threshold Rth.

As described above, the ultrasonic flaw detection device A of this embodiment includes the processing unit 21 that determines an index indicating the degree of quality of the detection signal W based on the air pocket area HA that is an area in which air pockets are shown in the predetermined area H of the captured image G of the two-dimensional pattern 1a imaged by the imaging device. The index indicating the degree of quality may be the ratio of the air pocket area HA to the predetermined area H or may be the contact rate R.

According to the above configuration, the examiner refers to an index such as the ratio of the air pocket area HA to the predetermined area H or the contact rate, and when the ratio is high or the contact rate is low, the examiner performs the rescanning, whereby even when there are air pockets between the ultrasonic probe and the inspection object, it is possible to limit a decrease in the reliability of the ultrasonic flaw detection inspection. The determining of the ratio is synonymous with the determining of the contact rate R.

In the ultrasonic flaw detection inspection, when there are air pockets between the ultrasonic probe 2 and the inspection object, the transmission of ultrasonic waves may be hindered, and flaws may not be correctly detected. Accordingly, it is conceivable that when air pockets are present, the detection results of the ultrasonic probe are not used for the ultrasonic flaw detection inspection. For example, it is conceivable that the ultrasonic flaw detection device stops collecting the data of the detection signal W immediately after air pockets were detected. However, if this is performed, it may take time to collect data, and sufficient data may not be obtained. It is practically difficult depending on the surface condition such as undulations of the inspection object to completely eliminate air pockets. Therefore, under such circumstances, air pockets have to be allowed to some extent. However, the amount of air pockets to be allowed depends on examiners, and thus when an inexperienced examiner performs the ultrasonic flaw detection inspection, the quality of the detection signal W deteriorates, and the reliability of the ultrasonic flaw detection inspection decreases.

The ultrasonic flaw detection device A of this embodiment obtains an index (e.g., the above ratio or the contact rate R) indicating the degree of quality of the detection signal based on the air pocket area HA. Therefore, the examiner can perform the ultrasonic flaw detection inspection while referring to the index, and it is possible to limit a decrease in the reliability of the ultrasonic flaw detection inspection.

The whole or part of the above-described information-processing device 5 may be configured of a computer. In this case, the computer may include a processor such as a CPU and a GPU and a computer-readable recording medium. A program for causing the computer to obtain the whole or part of the functions of the information-processing device 5 may be recorded in the computer-readable recording medium, and the program recorded in the recording medium may be read into the processor and may be executed, thereby obtaining the whole or part of the functions. The "computer-readable recording medium" refers to a portable medium such as a flexible disk, a magneto-optical disk, a ROM or a CD-ROM, or a storage device such as a hard disk provided inside a computer system. The "computer-readable recording medium" may include a medium that dynamically holds a program for a short period of time, such as a communication line for transmitting the program through a network such as the Internet or a telephone line, and a medium that holds a program for a certain period of time, such as a volatile memory inside a computer system serving as a server or a client in that case. The above program may be a program for obtaining part of the above-described functions, may be a program that can obtain the above-described functions in combination with another program recorded in a computer system in advance, or may be a program obtained by using a programmable logic device such as FPGA.

The "computer-readable recording medium" may be a non-temporary computer-readable recording medium.

In the above embodiment, a configuration in which the inspection target is the pipe P has been described, but the present disclosure is not limited to this. The inspection target may be a rod member, a tube member, a plate member or the like made of metal (e.g., weldable metal), a rolled member, a forged member, or a welded portion thereof. Substances such as carbon fiber-reinforced plastic (CFRP), which can be inspected by the ultrasonic flaw detection, may be the inspection target.

INDUSTRIAL APPLICABILITY

The present disclosure can be applied to an ultrasonic flaw detection device that scans an inspection object using an ultrasonic probe to detect flaws or corrosion in the inspection object.

DESCRIPTION OF REFERENCE SIGNS

A ultrasonic flaw detection device
1 sheet material
2 ultrasonic probe
3 imaging device
4 ultrasonic flaw detector
5 information-processing device
11 display
12 operation unit
13 communication I/F section
14 control unit
21 processing unit
22 display control unit

The invention claimed is:

1. An ultrasonic flaw detection device, comprising:
an ultrasonic probe that emits ultrasonic waves to an inspection object and detects reflected waves;
a sheet material attached to a surface of the inspection object and having two-dimensional patterns shown thereon, the two-dimensional patterns being arranged on the inspection object and indicating positions on the inspection object;
an imaging device attached to the ultrasonic probe and imaging the two-dimensional patterns; and
a processing unit that reads position information indicating a position on the inspection object from a captured image captured by the imaging device and relates a detection result of the ultrasonic probe to the position information, wherein
the processing unit determines an index indicating a degree of quality of the detection result based on an air pocket area that is an area in which air pockets are shown in a predetermined area of the captured image.

2. The ultrasonic flaw detection device according to claim 1, wherein
the processing unit determines a ratio of the number of pixels of the air pocket area to the number of total pixels of the predetermined area in the captured image and determines a contact rate of the sheet material to the inspection object.

3. The ultrasonic flaw detection device according to claim 2, wherein
the processing unit determines the contact rate from the captured image obtained at the same time as the detection result of the ultrasonic probe and relates the determined contact rate to the detection result.

4. The ultrasonic flaw detection device according to claim 3, comprising:
a display control unit that displays, on a display, a scanning area of the ultrasonic probe on the inspection object such that the scanning area is divided into a plurality of divided areas arranged in mesh pattern, wherein
the display control unit displays, in a first display mode, a divided area of the plurality of divided areas containing position information related to the contact rate when the contact rate is greater than a threshold value and displays, in a second display mode different from the first display mode, a divided area of the plurality of divided areas containing position information related to the contact rate when the contact rate is equal to or less than the threshold value.

5. The ultrasonic flaw detection device according to claim 4, comprising:
an operation unit, wherein
when any divided area is selected from the plurality of divided areas through the operation unit, the display control unit displays, on the display, the detection result corresponding to the selected divided area and the contact rate related to the corresponding detection result.

* * * * *